United States Patent [19]

Chipman et al.

[11] Patent Number: 4,961,634
[45] Date of Patent: Oct. 9, 1990

[54] INFRARED ACHROMATIC RETARDER

[75] Inventors: Russell Chipman, Madison; David Chenault, Huntsville, both of Ala.

[73] Assignee: The University of Alabama in Huntsville, Huntsville, Ala.

[21] Appl. No.: 365,795

[22] Filed: Jun. 14, 1989

[51] Int. Cl.$^5$ ............................................... G02B 5/30
[52] U.S. Cl. .................................... 350/403; 350/406; 350/407; 350/1.1
[58] Field of Search ................. 350/1.1, 1.4, 403, 404, 350/405, 406, 407, 311, 316; 250/504 R

[56] References Cited

U.S. PATENT DOCUMENTS

| | | | |
|---|---|---|---|
| 4,229,073 | 10/1980 | Lotspeich | 350/400 |
| 4,500,178 | 2/1985 | Yeh | 350/404 |
| 4,548,479 | 10/1985 | Yeh | 350/404 |
| 4,772,104 | 9/1988 | Buhrer | 350/403 |

*Primary Examiner*—Rodney B. Bovernick
*Assistant Examiner*—R. D. Shafer

*Attorney, Agent, or Firm*—Oblon, Spivak, McClelland, Maier & Neustadt

[57] ABSTRACT

An infrared achromatic waveplate structure having a cadmium sulfide (CdS) plate and a cadmium selenide (CdSe) plate aligned with each other so that the fast axis of the plates are perpendicular to each other, this structure provides a desired retardance of a first orthogonal polarization component with respect to a second orthogonal polarization component of an incident light beam. The thickness of the plates are in a ratio between 0.8:1 and 0.9:1 (CdSe:CdS), an achromatic response with a substantially constant retardance is provided in a wavelength range from 3 to 11 microns. A desired amount of retardance is available by adjusting the thickness of the two plates as long as the ratio of the thicknesses is maintained within the recited value. In particular a quarter wave net retardance of an incident light beam operating between 3 and 11 microns is provided when the cadmium sulfide plate is 1.25 millimeters and the cadmium selenide plate is 1.0666 millimeters.

4 Claims, 1 Drawing Sheet

INFRARED ACHROMATIC RETARDER

BACKGROUND OF THE INVENTION

1. Field of the Invention

The present invention relates to an infrared achromatic waveplate capable of improved response as a function of wavelength in a simple, small and inexpensive configuration of waveplates.

2. Discussion of Background

Many optical systems including those for spectropolarimetry, laser polarimetry, laser spectroscopy, and ellipsometry have a need for converting light between polarization states and a need to analyze polarized light. The design of polarimeters requires polarization elements whose properties satisfy a number of criteria including the very important criteria that the polarization properties need to be substantially constant over a range of wavelength of interest. Additional constraints in this area include a reasonable element size and proper positioning of the light beam exiting from the element and of course the cost of the element.

Liquids and amorphous solids such as glass and crystalline solids have a cubic symmetry which normally show a behavior whereby the speed of light and the index of refraction is independent of the direction of propagation in the medium and is independent of the state of the polarization of the light. These types of elements are said to be optically isotropic. Other crystalline solids, which induce birefringent behavior, are optically anisotropic. Of course, solids may be anisotropic in many of their properties, but it is the optical anisotropy of a material which is used in order to provide the "double refraction" of a beam. The two emerging beams from an optically anisotropic material are plane-polarized beams with their planes of vibration at right angles to each other.

The conversion of light between polarization states and the analysis of polarized light has traditionally involved the use of birefringent materials wherein a light beam incident on a birefringent material is divided into two orthogonal polarization components. A retarder can then shift the phase or in other words retard the phase of one of these two orthogonal polarization components with respect to the other component. In a birefringent material, the index of refraction depends on the polarization state of the light beam.

The most appropriate way that these anisotropic or birefringent materials are used involves the exploiting of the dependency of the index of refraction on the polarization state of the incoming light beam. A phase shift is introduced between the polarization state aligned with the fast axis of the birefringent material, where the index of refraction is the smallest and the polarization state aligned along the slow axis of the material, where the index of refraction is at its highest value.

When plane-polarized light falls at normal incidence on a slab or piece of anisotropic material so that the optic axis is parallel to the face of the slab, the two waves which emerge are plane-polarized at right angles to each other. Because the waves travel through the material at different speeds, there will be a phase difference between the two waves when they emerge from the material. If the material thickness is chosen so that for a particular frequency of light the phase angle or "phase change between the two waves" is 90°, the slab or piece of material is called a quarter-waveplate. If linearly polarized light is incident on this quarter waveplate with its plane of polarization oriented at ±45° to the fast axis, the emerging light is said to be circularly polarized.

Traditionally then, the proper thickness of the material was chosen in order to obtain the desired retardance. However, these prior art designs are very sensitive to small changes in wavelength of the incident beam and thus are not suitable for many optical systems where broadband light is used.

While other designs have better response as a function of wavelength, they involve complicated, large and expensive devices as for example in a design utilizing a modified Fresnel rhomb which is 4 inches long which of course exceeds the requirements for size.

Still other designs cause the exit beam to be shifted from the path of the incident beam which also makes these designs not appropriate for such polarimeter usage.

Thus, there is a specific need for an achromatic infrared retarder in which the polarization properties of the element is substantially constant over a particular range of wavelength and wherein the elements are small in size and produce a light beam which is properly positioned upon emergence from the element.

SUMMARY OF THE INVENTION

It is the object of the present invention to provide a configuration of two plates made of cadmium sulfide and cadmium selenide respectively with the fast axis of the materials at right angles to each other in order to produce polarization of incident light which is substantially constant over a range of wavelengths.

It is another object of the present invention to provide a retarder which can shift the phase or retard the phase of one of two orthogonal polarization components in such a way that the resultant device is inexpensive, insensitive to changes in wavelength and easy to manufacture.

The structure which accomplishes these objects involves a Cadmium Sulfide (CdS) plate and a Cadmium Selenide (CdSe) plate oriented so that the fast axis of the plates are perpendicular to each other in order to provide a positive retardance from one plate and a negative retardance from the other plate with the net effect providing a desired retardance.

The device according to the present invention provides achromatic response in the wavelength range of from 3-11 microns when the thickness of the plates have a ratio of between 0.8:1 and 0.9:1 (CdSe:CdS).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
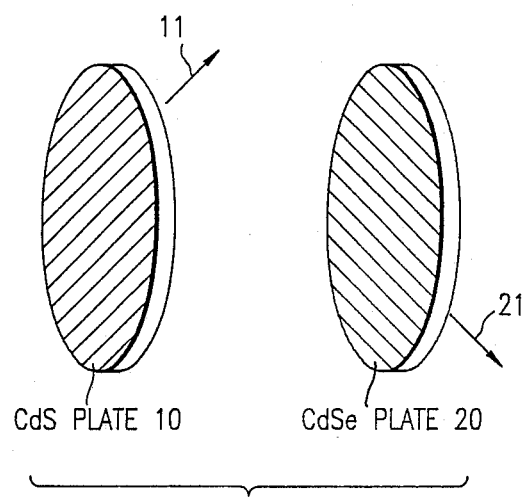
FIG. 1 illustrates the structure of the two plates having their fast axis at right angles to each other.

Referring now to the drawings, and more particularly to FIG. 1 thereof, there is shown an orientation of two plates 10 and 20. The plate 10 is made of Cadmium Sulfide (CdS) and plate 20 is made of Cadmium Selenide (CdSe). These plates have similar birefringent properties as a function of wavelength and the orientation of the two plates is such that the fast axis 11 of plate 10 is at a right angle with respect to the fast axis 21 of plane 20. One of the plates produces a retardance of one polarization state (state 1) with respect to the other state (state 2) while the second plate retards state 2 with respect to state 1. The first plate 10 produces a positive retardance and the second plate 20 produces a negative retardance with the net result being a substantially constant retardance over a broad wavelength range.

Figure 2:
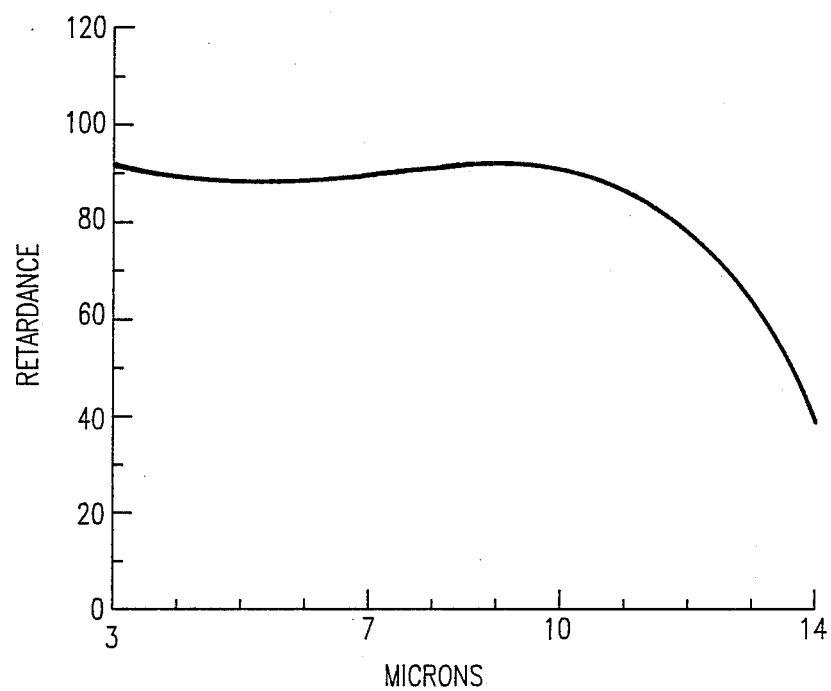
FIG. 2 graphically illustrates the retardance as a function of wavelength of the achromatic retarder of the present invention.

By choosing the proper thickness for each plate, a quarter wave retardance occurs over a broad wavelength range as illustrated in FIG. 2. Given the achromatic response for one quarter wavelength retardance, the ratio between the thicknesses of the two plates is computed. Waveplates of other retardances may be constructed by varying the thickness of the plates with the ratio being kept constant.

In order to obtain retardances for various thickness, numerous experiments may be conducted or a program may be utilized to calculate the retardances of birefringent plates with the material properties of CdS and CdSe being entered into the program. For a net retardance of one quarter wave, the thickness of the CdS plate is 1.25 millimeters and the thickness of the CdSe plate is 1.0666 millimeters. This provides a ratio of the CdSe to CdS of 0.853.

The thickness of each of these plates is ideal for fabrication because the single crystals of this size can be grown. Furthermore, the plates are thick enough to retain structural strength.

This design utilizes the materials CdS and CdSe and is specifically used in the mid-infrared region. As a result the device, which is used as a retarder, is an optical component which converts light between the polarization states and by varying the thickness of the plates, while holding the ratio constant, the retardance of a quarter-or half-wave or of any arbitrary value may be fabricated.

The response of these two materials, cadmium sulfide and cadmium selenide, when used together in this manner provided a remarkable improvement in the formation of an achromatic waveplate over a very broad wavelength range. The particular embodiment wherein the ratio of the thickness of the plates is between 0.8:1 and 0.9:1 (CdSe:CdS) provided achromatic response in the wavelength range from 3 to 11 microns.

Although the discussed embodiment utilizes 100% cadmium sulfide and cadmium selenide respectively, composite materials having doped cadmium sulfide or doped cadmium selenide could be used. Materials such as zinc selenide, galium arsenide, mercury, indium, galium, arsenic and zinc could be utilized as additive materials to either or both of the cadmium sulfide and cadmium selenide waveplates. The criteria for selection and addition of additive materials is controlled by the birefringent characteristics of the resultant composite material. In other words, any material may be added in small amounts as a doping in order to form a composite material for the first and second waveplate as long as the birefringent characteristics of the resulting composite materials is substantially the same as cadmium sulfide alone or cadmium selenide alone for the first or second waveplates.

In order to avoid any reflection losses which occur due to the passage of the light through the four surfaces of the two plates, an anti-reflection coating ma be applied to each of the surfaces of the plates 10 and 20.

Furthermore, a computer program may be substituted for experimentation in order to calculate the retardances of the birefringent plates. The material properties of CdS and CdSe are entered into the program and the various retardances calculated for each material as a function of wavelength.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. An achromatic retarder for shifting two orthogonal polarization components, with respect to each other, of an incident light beam;

a first waveplate made of substantially cadmium sulfide having a fast axis;

a second waveplate made of substantially cadmium selenide having a fast axis wherein said first and second plates are oriented so that said fast axis of said first plate is at a right angle with respect to said fast axis of said second plate and wherein said first plate produces a retardance of a first polarization state with respect to a second polarization state while said second plate produces a retardance of said second polarization state with respect to said first polarization state to produce a net retardance which has a substantially constant value over a range of wavelength values of interest for said light beam.

2. The retarder according to claim 1 wherein the ratio of the thickness of said second plate with respect to said first plate is in a range of between 0.8:1 and 0.9:1 in order to provide achromatic response in the wavelength range from 3 to 11 microns.

3. The retarder according to claim 1 wherein the thickness of said first plate is 1.25 millimeters and the thickness of said second plate is 1.0666 millimeters and wherein said net retardance of said retarder is one quarter of the wavelength of said incident light beam.

4. The retarder according to claim 1 further comprising anti-reflection coatings provided on both a first and a second surface of each of said first and second plates.

* * * * *